April 14, 1953

F. J. FONTEIN 2,634,741

PROCESS OF CONTROLLING THE RATE OF DISCHARGE
OF LIQUID SUSPENSIONS FROM CONTAINERS

Filed Oct. 9, 1946

Inventor
Freerk J. Fontein,

By Cushman, Darby & Cushman his Attorneys

Patented Apr. 14, 1953

2,634,741

UNITED STATES PATENT OFFICE 2,634,741

PROCESS OF CONTROLLING THE RATE OF DISCHARGE OF LIQUID SUSPENSIONS FROM CONTAINERS

Freerk J. Fontein, Heerlen, Netherlands, assignor to De Directie van de Staatsmijnen in Limburg, Heerlen, Netherlands Application October 9, 1946, Serial No. 702,308

4 Claims. (Cl. 137—2)

This invention relates to methods for controlling the rate of flow of fluid materials.

There are numerous instances in which it is desirable to possess some method by which the rate of flow of fluid materials to or from containers or through pipes or other conduits may be controlled without resort to the use of valves or other restricting devices having moving parts and flow contricting elements. An example of such a situation is in coal-washing plants operated with suspensions of the solid matter in aqueous media and other comparable ore-dressing plants where it is necessary to draw off the suspension from receivers or containers holding the suspensions. It is desirable in such operations to control the rate of flow of the suspension so that, if the solids content of the suspension is low, only a small amount of the suspension is drawn off from the receiver, whereas, if the concentration of the solids in the suspension is high, a larger amount of the fluid material must be withdrawn. Other numerous situations exist in which it is desirable or essential that the rate of flow of fluid materials be controlled by some positive means not employing moving mechanical parts.

Heretofore, the regulation of fluid flow has necessitated the use of flow controlling means such as valves, flexible diaphragm restrictors or other apparatus in which the fluid flow is regulated by the constriction of the fluid stream by abutments or other constricting, moving elements. Various disadvantages are associated with the use of these prior art devices for fluid control, particularly with regard to suspensions of solid materials. Thus, where valves or comparable units are used for the fluid control, as the valve is throttled to restrict the magnitude of the fluid stream, the effective diameter of the fluid conduit becomes smaller with increasing opportunity and likelihood for the conduit to become blocked by the solid material in the suspension.

A principal object of this invention is the provision of new method for the control of the rate of flow of fluid materials. A further object is the provision of means whereby the flow of fluid material may be controlled without the use of moving mechanical parts. A still further object is the provision of a flow control device with inlet and discharge openings of such size that blocking of these openings by large particles in suspensions flowing therethrough is substantially impossible. Another object is the provision of apparatus for the control of fluid flow which is automatically responsive to the magnitude of the fluid flow entering the control unit. Still further objects and the entire scope of practicability of this invention will become apparent from the detailed discussion given hereinafter.

These objects are accomplished according to the present invention by a process which comprises causing the flow of the fluid material which it is desirable to control to flow tangentially into a circular path of relatively small radius, so that the entrance of further material into this circular path is restricted by the centrifugal force of the fluid material flowing in the circular path and discharging the fluid material centrally and axially of the circular path.

This invention provides new apparatus for accomplishing such a procedure, the details of which may be most readily comprehended by reference to the attached more or less schematic drawing, in which.

Figure 1:
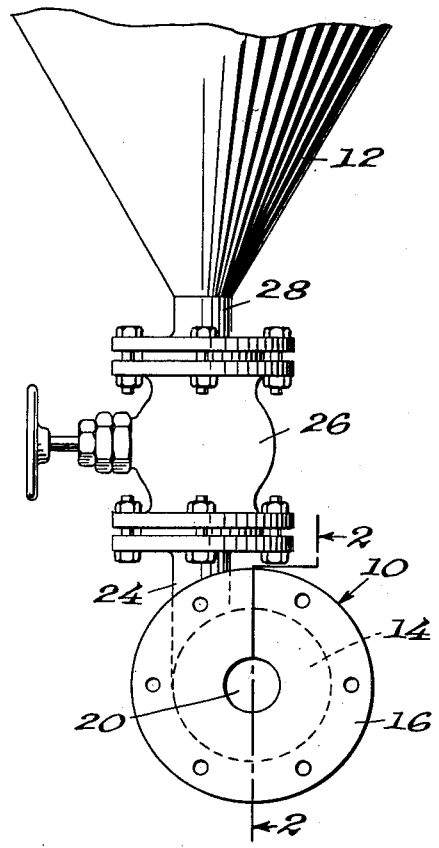
Figure 1 is a schematic side view of one embodiment of this apparatus.

Referring in detail to the illustrations, there is shown the flow control device 10 connected to a fluid material container 12.

The flow control device 10 is extremely simple in construction and incorporates no moving parts. This device consists of a cylindrical chamber 14 having end plates 16 and 18. The end plate 16 is provided with an opening 20 situated substantially in the center of the circular plate.

The control device 10 is further provided with an inlet pipe 24 which leads tangentially into the cylindrical chamber 14.

The flow control unit 10 is connected to the container 12 by connecting means consisting of a valve 26 and a pipe 28. The valve 26 is flanged for attachment to the flanged end 30 of the inlet pipe 24.

The opening 20 which is positioned centrally and axially of the cylindrical chamber 14, serves as a discharge port for fluid material flowing through the control unit 10.

Figure 2:
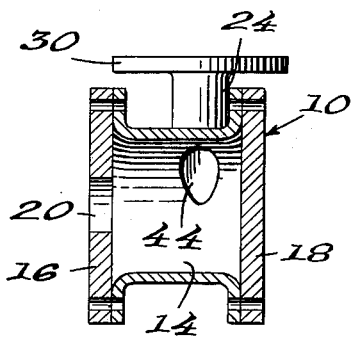
Figure 2 is a sectional view of the flow control unit of the apparatus shown in Figure 1 taken along the line 2—2.
Figure 3:
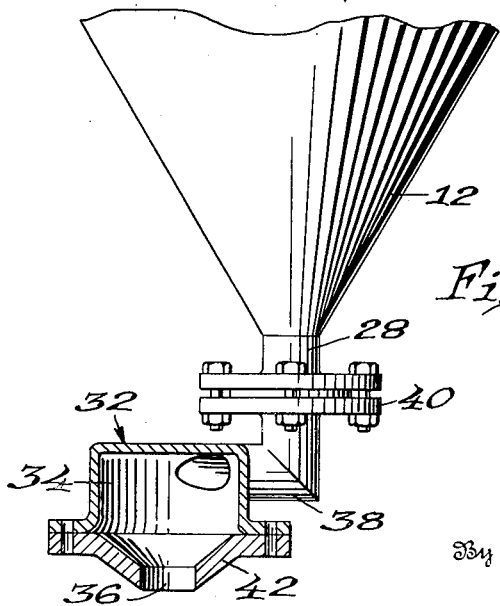
Figure 3 is a side view partly in section of a modified form of apparatus incorporating the flow control device of this invention.

A modified form of the control unit is illustrated in Figure 3. There is sown in this illustration the control unit 32 connected to a fluid material container 12. The flow control unit 32, as in the case of the unit 10, shown in Figures 1 and 2, possesses the essential elements of the control device of this invention which comprises the cylindrical chamber 34 of relatively small radius having a discharge port 36 positioned centrally and axially of the cylindrical chamber 34 in conically shaped end walls 42 and an inlet tube 38 which leads tangentially into the cylindrical chamber. The inlet pipe 38 is bent at right angles so that when connected by the flange 40 to the vertical discharge pipe 28 of the container 12, the axis of the discharge port 36 is in a vertical position, in contrast to the horizontal position of the axis of discharge port 20 of the control unit 10 described above.

With these details of this flow control device in mind, the mode of operation of the device may be readily comprehended.

The effect of the device is, that if the viscosity of the fluid is low, the amount of fluid discharged is low and, if the viscosity is high, the amount of the fluid discharged is high. Thus, if the viscosity is low, the tangential velocity with which the fluid comes into the device will be low. On the other hand, the centrifugal forces which are generated and which restrict the final output out of the device are high due to the frictional forces between the different strata, which are formed concentrically in the device. The tangential velocity of these strata tends to increase with decreasing radius. Due to these high centrifugal forces, the pressure at the input of the device is high and, thus, the pressure difference between container and device, which finally governs the rate of flow is low, with the effect that the amount of fluid which is discharged by the device is low.

On the other hand, if the viscosity is high, the frictional forces between the different strata are high. So there is only a moderate possibility for the tangential velocity to increase with decreasing radius. The lower this tangential velocity, the lower the centrifugal forces which are generated.

If the centrifugal forces, due to this high viscosity are low, the pressure in the device will be low and, hence, the pressure difference between device and container is high and the amount of fluid, discharged by the device is high.

The operation of the process of this invention is further comprehendable from the following illustrative example.

*Example*

A suspension storage tank for a coal washing plant is provided at its base outlet with a flow control device of this invention. This control device has an inlet pipe of 7/16 inch inside diameter and a single discharge port of the same diameter. The inside diameter of the cylindrical chamber of the control unit is 1¼ inches and the height of the chamber is ¾ inch.

With a coal separating unit operating with a suspension of loess in water and the storage tank containing a suspension with a concentration of 10% by weight of the solid material, the flow control device permits 0.32 cubic meter per hour of the suspension to discharge. At this concentration of suspension, the contraction coefficient is 0.144.

In another case in which the concentration of the loess suspension is 41% by weight of solid, the control permits 0.54 cubic meter per hour to be discharged which coresponds to a contraction coefficient of 0.282. Thus, this control device operates to permit larger quantities of the liquid suspension of high solids content to be discharged than in the case of the lower concentration suspension, as is desired for proper operation of the separating apparatus.

It is possible to control the flow of many types of materials by means of the present process and apparatus. Thus, fluids, such as pure liquids may be controlled or fluid materials, such as suspensions of solid materials in liquids or gases in liquids may be controlled. The term "fluid material," as used herein and the following claims, is intended to include all of these types of materials, while the term "liquid material," as used herein, means those materials which are predominantly liquid in character, as opposed to those which are predominantly gaseous in character, e. g., finely divided solid matter suspended in water.

Since many and various modifications to the present invention will become apparent to those skilled in the art from the detailed description given herein, it is to be understood that this invention is to be limited only in accordance with the following claims.

I claim:

1. The process of controlling the rate of discharge of liquid suspensions from containers so that the rate of discharge increases with an increase in the solids content of the suspension which comprises flowing the suspension from the container tangentially into a circular path of relatively small radius, whereby the rate of discharge is restricted by the centrifugal force of the suspension flowing in said circular path and, thereafter, discharging the suspension from the locus of its circular flow axially of the circular path.

2. The process of continuously and automatically controlling hydraulically the quantity of a liquid dispersion of varying solids content emitted from a container whereby the quantity emitted increases upon increase of the solids content and decreases upon decrease of the solids content, which comprises flowing of liquid suspension from the container through a confined passage and emitting it tangentially into a body to establish its rotation, with the speed of rotation of the liquid suspension being determined by the solids content of the suspension, such speed generating centrifugal forces within the body which exert a back pressure on the suspension being emitted from the confined passage, and discharging axially from the body a stream of suspension in such hydraulically controlled quantity.

3. A process as claimed in claim 1, wherein said suspension is discharged along a horizontal axis.

4. A process as claimed in claim 1, wherein said suspension is discharged along a vertical axis.

FREERK J. FONTEIN.

References Cited in the file of this patent

UNITED STATES PATENTS

| Number | Name | Date |
|---|---|---|
| 491,354 | Jett | Feb. 7, 1893 |
| 1,293,108 | Judson | Feb. 4, 1919 |
| 1,517,598 | Stevensen | Dec. 2, 1924 |
| 1,710,832 | Mart | Apr. 30, 1929 |
| 1,839,616 | Thoma | Jan. 5, 1932 |
| 2,135,582 | Kohler | Nov. 8, 1938 |
| 2,229,601 | Park | Jan. 21, 1941 |
| 2,304,272 | Mueller | Dec. 8, 1942 |